United States Patent [19]

Nilssen

[11] Patent Number: 5,404,083
[45] Date of Patent: Apr. 4, 1995

[54] ENERGY-EFFICIENT COST-EFFECTIVE ELECTRONIC BALLAST

[76] Inventor: Ole K. Nilssen, Caesar Dr., Barrington, Ill. 60010

[21] Appl. No.: 908,924

[22] Filed: Jul. 2, 1992

Related U.S. Application Data

[63] Continuation of Ser. No. 614,037, Nov. 19, 1990, abandoned, which is a continuation of Ser. No. 96,461, Sep. 15, 1987, abandoned, which is a continuation-in-part of Ser. No. 730,596, May 6, 1985, Pat. No. 4,855,860, which is a continuation-in-part of Ser. No. 640,240, Aug. 13, 1984, Pat. No. 4,563,719, which is a continuation of Ser. No. 412,771, Aug. 30, 1982, abandoned.

[51] Int. Cl.⁶ .............................. H05B 41/36
[52] U.S. Cl. ............................ 315/244; 315/106; 315/224; 315/DIG. 5; 315/DIG. 7
[58] Field of Search ................. 315/244, 243, 315/245, 106, 107, 224, DIG. 4, 315/DIG. 5, DIG. 7

[56] References Cited

U.S. PATENT DOCUMENTS

| | | | |
|---|---|---|---|
| 4,060,751 | 11/1977 | Anderson | 315/242 |
| 4,060,752 | 11/1977 | Walker | 315/243 |
| 4,259,614 | 3/1981 | Kohler | 315/244 |
| 4,346,332 | 8/1982 | Walden | 315/244 |
| 4,398,126 | 8/1983 | Zuchtriegel | 315/244 X |
| 4,538,095 | 8/1985 | Nilssen | 315/244 |
| 4,641,061 | 3/1987 | Munson | 315/224 X |
| 5,013,973 | 5/1991 | Nilssen | 315/244 |

Primary Examiner—Robert J. Pascal
Assistant Examiner—Michael Shingleton

[57] ABSTRACT

An inverter-type electronic fluorescent lamp ballast normally powers a fluorescent lamp by way of a series-excited parallel-loaded resonant L-C circuit. During the lamp starting phase, as well as whenever the lamp is inoperative or not connected, inverter frequency is automatically increased substantially beyond resonance, thereby preventing circuit self-destruction which would otherwise probably result whenever an inverter is used for series-exciting an unloaded resonant L-C circuit.

12 Claims, 2 Drawing Sheets

1

ENERGY-EFFICIENT COST-EFFECTIVE ELECTRONIC BALLAST

Related Applications

This application is a Continuation of Ser. No. 07/614,037 filed Nov. 19, 1990, now abandoned; which is a Continuation of Ser. No. 07/096,461 filed Sep. 15, 1987, now abandoned; which is a Continuation-in-Part of Ser. No. 06/730,596 filed May 6, 1985, now U.S. Pat. No. 4,855,860; which is a Continuation-in-Part of Ser. No. 06/640,240 filed Aug. 13, 1984, now U.S. Pat. No. 4,563,719; which is a Continuation of Ser. No. 06/412,771, filed Aug. 30, 1982, now abandoned.

BACKGROUND OF THE INVENTION

1. Field of Invention

The present invention relates to inverter-type electronic ballasts for gas discharge lamps, particularly of the type wherein a gas discharge lamp is connected with the inverter's output by way of a series-excited parallel-loaded resonant L-C circuit.

2. Description of Prior Art

Inverter-type electronic ballasts for gas discharge lamps of the type wherein the inverter output is connected with the gas discharge lamp by way of a series-excited parallel-loaded resonant L-C circuit are fundamentally cost-effective and energy-efficient. Such ballasts are described in prior art, such as in U.S. Pat. Nos. 4,461,980, 4,581,562 and 4,663,571 to Nilssen.

However, a very basic problem associated with such series-resonance-loaded inverter-type ballasts is that of the likelyhood of self-destruction in the event that the lamp is removed or otherwise fails to constitute a proper load on the series-resonant L-C circuit.

The prior art has dealt with that problem in various ways; and the issue now is basically that of finding a still more cost-effective way of so doing.

SUMMARY OF THE INVENTION

Objects of the Invention

An object of the present invention is that of providing an energy-efficient cost-effective inverter-type electronic ballast for gas discharge lamps.

More specifically, an object is that of providing an energy-efficient cost-effective inverter-type ballast of a type wherein the inverter is powering a gas discharge lamp by way of a series-excited parallel-loaded resonant L-C circuit.

This as well as other objects, features and advantages of the present invention will become apparent from the following description and claims.

BRIEF DESCRIPTION

In its preferred embodiment, subject invention constitutes a series-excited parallel-loaded fluorescent lamp ballast comprising the following key component parts:

a source of DC voltage, which DC voltage is derived by rectification of the AC voltage from a regular 60 Hz power line;

an inverter connected with the source of DC voltage and operative to provide across an output a high-frequency square-wave voltage, the inverter having control input means operative in response to a control signal to control the frequency of the squarewave voltage between a minimum frequency and a maximum frequency;

an L-C circuit series-connected across the output, the L-C circuit having: i) a main tank-capacitor, ii) a main tank-inductor, and iii) a natural resonance frequency equal to the fundamental frequency of the squarewave voltage at its minimum frequency;

a pair of auxiliary tank-inductors, each magnetically coupled to the main tank-inductor and connected by way of an auxiliary capacitor to a pair of cathode power output terminals, each auxiliary tank-inductor being series-resonant with its auxiliary tank-capacitor at the fundamental frequency of the squarewave voltage at its maximum frequency;

a fluorescent lamp having a pair of main lamp power input terminals and two pairs of cathode power input terminals;

connect means operative to connect: i) the main lamp power input terminals across the tank-capacitor, and ii) each pair of cathode power input terminals with one of the pairs of cathode power output terminals; and control means: i) responsive to lamp current flowing through the fluorescent lamp, ii) connected with the control input means, and iii) operative to provide the control signal in such manner as to increase the frequency of the squarewave voltage in response to the flow of lamp current;

whereby:

a) the inverter is protected from self-destruction by making the frequency of the squarewave voltage substantially higher than the L-C circuit's natural resonance frequency whenever the L-C circuit is inadequately loaded, as signified by absence of lamp current; and
b) the amount of cathode heating power is reduced as the magnitude of lamp current is increased, thereby improving overall operating efficiency.

DESCRIPTION OF THE PREFERRED EMBODIMENT

Details of Construction

Figure 1:
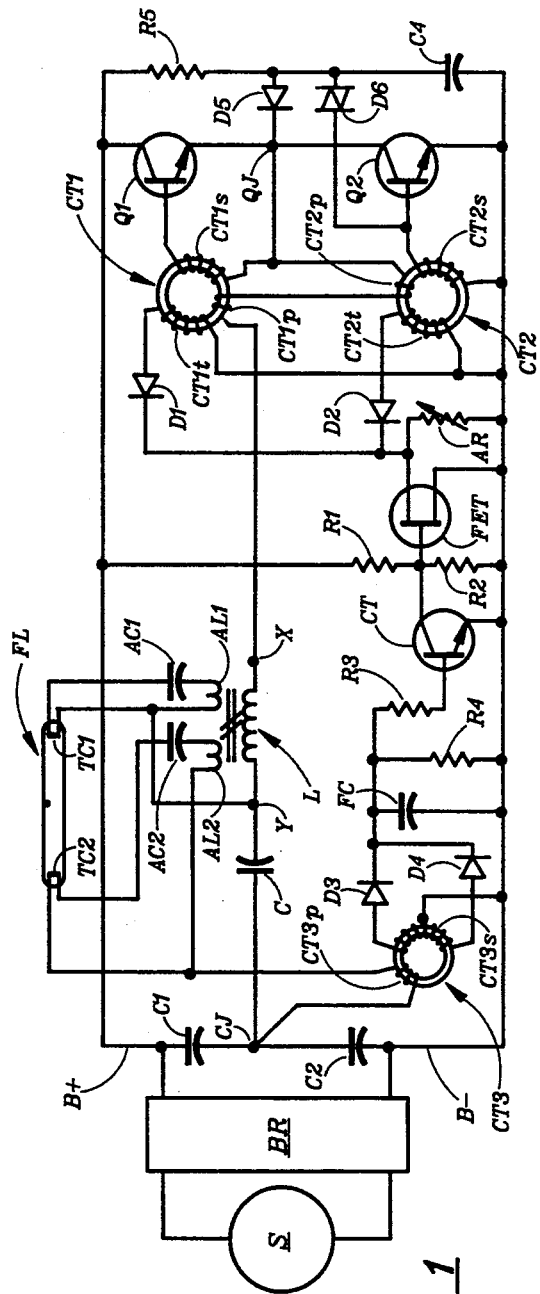
FIG. 1 schematically illustrates the preferred embodiment of the invention.

In FIG. 1, a source S of 120 Volt/60 Hz voltage is applied to a full-wave bridge rectifier BR, the unidirectional voltage output of which is applied directly between a B+ bus and a B+ bus, with the positive voltage being connected to the B+ bus.

Between the B+ bus and the B− bus are connected a series-combination of two transistors Q1 and Q2 as well as a series-combination of two energy-storing capacitors C1 and C2.

A secondary winding CT1s of positive feedback current transformer CT1 is connected directly between the base and the emitter of transistor Q1; a secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with a junction CJ. One terminal of capacitor C2 is connected directly with the B− bus, while the other terminal of capacitor C2 is connected directly with junction CJ.

An inductor L and a capacitor C are connected in series with one another and with primary windings CT1p and CT2p of current transformers CT1 and CT2.

The series-connected primary windings CT1p and CT2p are connected directly between junction QJ and a point X. Inductor L is connected with one of its terminals to point X and with the other of its terminals to another point Y; and capacitor C is connected between point Y and junction CJ.

A first auxiliary inductor AL1 is coupled loosely with tank-inductor L and is connected in series with a first auxiliary capacitor AC1 and a first thermionic cathode TC1 of a fluorescent lamp FL; a second auxiliary inductor AL2 is also coupled loosely with tank-inductor L and is connected in series with a second auxiliary capacitor AC2 and a second thermionic cathode TC2 of fluorescent lamp FL.

One of the terminals of thermionic cathode TC2 is connected by way of a primary winding CT3p of a current transformer CT3 to junction CJ; one of the terminals of thermionic cathode TC1 is connected with point Y. A secondary winding CT3s has two terminals and a center-tap; which center-tap is connected with the B− bus.

Current transformer CT1 has a tertiary winding CT1t connected between the B− bus and the anode of a diode D1; the cathode of diode D1 is connected with the cathode of a diode D2, whose anode is connected with one of the terminals of a tertiary winding CT2t of current transformer CT2. The other terminal of tertiary winding CT2t is connected with the B− bus.

A field effect transistor FET is connected with its drain terminal to the cathodes of diodes D1 and D2 and with its source terminal to the B− bus. An adjustable resistor AR is connected between the drain and source terminals. The gate terminal of transistor FET is connected with the B+ bus by way of a resistor R1 and with the B− bus by way of a resistor R2.

A control transistor CT is connected with its collector to the gate of transistor FET and with its emitter to the B− bus. Its base is connected by way of a resistor R3 to the cathode of a diode D3, whose anode is connected with one of the terminals of secondary winding CT3s of current transformer CT3. A diode D4 is connected with its anode to the other terminal of secondary winding CT3s and with its cathode to the cathode of diode D3.

A filter capacitor FC and a resistor R4 are both connected between the cathodes of diodes D3/D4 and the B− bus.

A resistor R5 is connected between the B+ bus and the anode of a diode D5, whose cathode is connected with junction QJ. A Diac D6 is connected between the anode of diode D5 and the base of transistor Q2. A capacitor C4 is connected between the anode of diode D5 and the B− bus.

Figure 2:
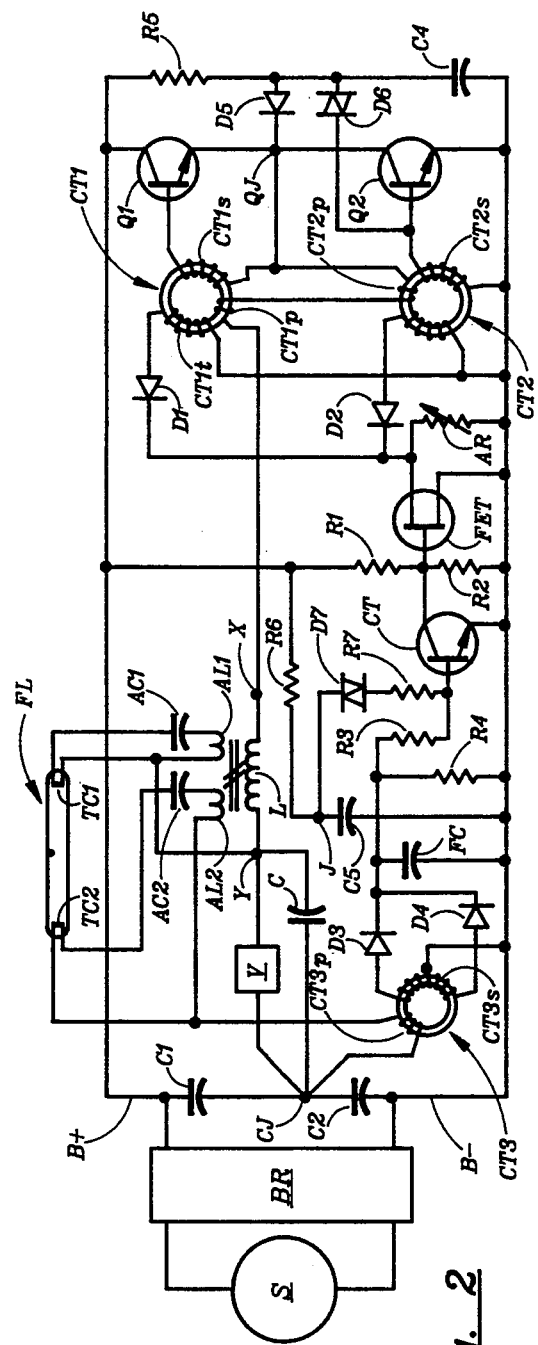
FIG. 2 illustrates a modified version of the preferred embodiment.

FIG. 2 is identical to FIG. 1 except for having: a Varistor V connected between junction CJ and point Y; a resistor R6 connected between the B+ bus and a junction J; a capacitor C5 connected between junction J and the B− bus; and a Diac D7 and a resistor R7 series-connected between junction J and the base of control transistor CT.

DETAILS OF OPERATION

In FIG. 1, source S represents an ordinary electric utility power line, the voltage from which is applied directly to the bridge rectifier identified as BR. This bridge rectifier is of conventional construction and provides for the rectified line voltage to be applied to the inverter circuit by way of the B+ bus and the B− bus.

The two energy-storing capacitors C1 and C2 are connected directly across the output of the bridge rectifier BR and serve to filter the rectified line voltage, thereby providing for the voltage between the B+ bus and the B− bus to be substantially constant in magnitude. Junction CJ between the two capacitors serves to provide a power supply center tap.

The inverter circuit of FIG. 1, which represents a so-called half-bridge inverter, operates in a manner that is analogous with circuits previously described in published literature, as for instance in U.S. Pat. No. 4,184,128 entitled High Efficiency Push-Pull Inverters.

Inverter oscillation is initiated by one or a few trigger pulses applied to the base of transistor Q2 by way of the combination of resistor R5, capacitor C4 and Diac D6. Once the inverter starts operating, the provision of trigger pulses ceases because diode D5 then prevents capacitor C4 from reaching a voltage high enough to cause Diac D6 to break down.

The output of the half-bridge inverter is a substantially squarewave AC voltage provided between point X and junction CJ. By controlling the degree by which the saturable feedback current transformers CT1/CT2 are re-set after each time they have been operative to supply base current to their respective transistors Q1/Q2, the frequency of this squarewave AC voltage can be controlled between about 30 kHz and 60 kHz.

The degree to which the saturable feedback current transformers are re-set is determined by the magnitude of the voltage presented to the tertiary windings CT1t/CT2t during the re-set period. By controlling the magnitude of this voltage, the degree of re-set is controlled correspondingly: the lower the magnitude of the voltage present across the tertiary windings during the re-set period, the lower the degree of re-set of the saturable magnetic cores of feedback transformers CT1/CT2.

And, the lower the degree of re-set, the shorter will be the duration of the periods where the feedback transformers provide drive current to the bases of transistors Q1/Q2, and the higher will be the frequency of the squarewave AC voltage.

Figure 3:
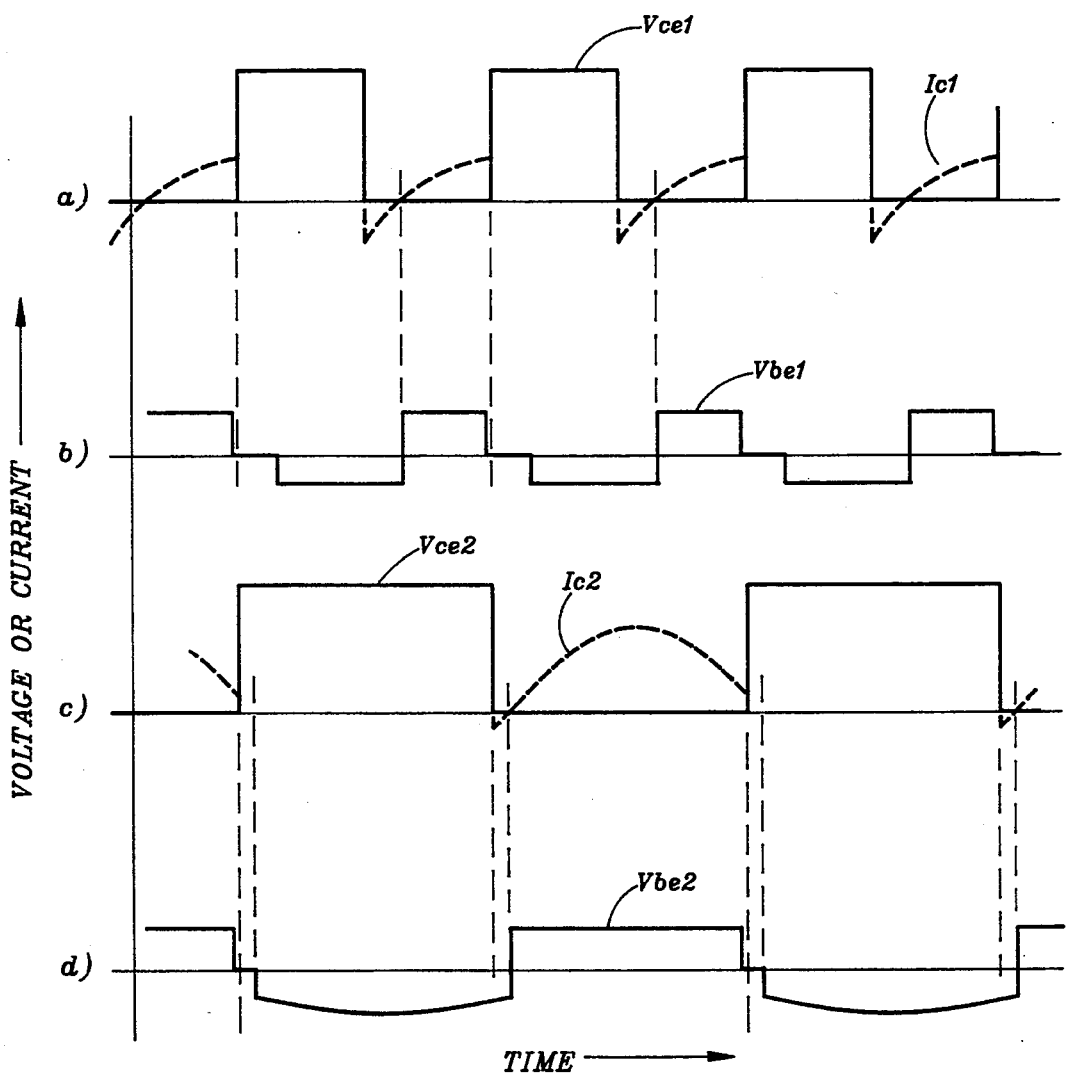
FIG. 3 shows various voltage and current waveforms associated with the preferred embodiment.

FIG. 3 illustrates the situation.

FIG. 3a depicts the collector-emitter voltage Vce1 of transistor Q2 during a first situation where the magnitude of the voltage across the tertiary windings of saturable feedback transformers CT1/CT2 is prevented from exceeding a relatively low level—as indicated in FIG. 3b, which depicts the corresponding base-emitter voltage Vbe1.

FIG. 3c depicts the collector-emitter voltage Vce2 of transistor Q2 during a second situation where the magnitude of the voltage presented to the tertiary windings of saturable feedback transformers CT1/CT2 is permitted to reach a relatively high level—as indicated in FIG. 3d, which depicts the corresponding base-emitter voltage Vbe2.

The frequency of inverter operation prevailing during the first situation is about twice that prevailing during the second situation (60 kHz or so versus 30 kHz or so).

Saturable feedback transformers CT1 and CT2 are both current transformers; which means that the magnitude of the voltage developing across a secondary or tertiary winding is a function of the magnitude of the associated primary current as multiplied by the turns-ratio and affected by the impedance characteristics of the load presented to this secondary or tertiary winding.

In particular, when transistor FET is fully conductive (i.e, acting like a short circuit)—which is the state it does indeed assume as long as no current flows through the fluorescent lamp (FL)—each of tertiary windings CT1t/CT2t is loaded with a forward-conducting diode during the re-set periods, while each of secondary windings CT1s/CT2s is loaded with a forward-conducting base-emitter junction during the drive periods. In other words, both the tertiary and the secondary windings are then loaded with a single forward-conducting diode junction.

However, the tertiary windings have about three times as many turns as do the secondary windings; which implies that the forward voltage drops presented by diodes D1/D2 to the tertiary windings have substantially less effect (per unit time) in terms of re-setting the magnetic cores of transformers CT1/CT2 than do the forward voltage drops presented to the secondary windings by the base-emitter junctions of transistors Q1/Q2 have in terms of setting the magnetic cores.

As a consequence of positive feedback, each transistor receive base current until its associated saturable feedback transformer reaches saturation; and the length of time it takes for this saturation to occur is proportional to the degree by which the magnetic core of the saturable feedback transformer has been reset.

FIGS. 3a and 3c also indicate the collector currents Ic1 and Ic2 flowing through transistor Q2 in correlation with collector-emitter voltages Vce1 and Vce2 and base-emitter voltages Vbe1 and Vbe2, all respectively.

When transistor FET is conducting, the situation of FIGS. 3a and 3b prevails; when transistor FET is non-conducting, the situation of FIGS. 3c and 3d prevails.

The conditions prevailing when transistor FET is nonconducting can be adjusted by adjustable resistor AR; which means that the lower inverter frequency can be adjusted by adjusting adjustable resistor AR.

The loosely coupled auxiliary inductors AL1 and AL2 are each tuned to series-resonate with auxiliary capacitors AC1 and AC2, respectively, at the higher inverter frequency; which means that, when the inverter frequency changes to the lower frequency, the amount of power provided to the cathodes will diminish significantly. The degree of diminishment can be chosen by way of choosing the loaded (operating) Q of the series-resonant circuits consisting of AL1/AC1 and AL2/AC2.

In the arrangement of FIG. 1, in the initial mode of the ballast, when the inverter oscillates at its higher frequency, the magnitude of the voltage present across tank-capacitor C is so arranged as to be just adequate to cause lamp current to start flowing after the cathodes have become thermionic. Then, as soon as some lamp current is flowing, current will be provided to the base of control transistor CT; which will then act to cause transistor FET to change to its non-conductive state, thereby causing the inverter to reduce its frequency to the lower frequency, which will then increase lamp current to its proper operational level.

If the lamp is non-connected, or if the lamp otherwise fails to conduct current, the ballast will remain in its initial mode of oscillating at the higher frequency.

In the arrangement of FIG. 2, the initial higher-frequency inverter mode is such as to provide proper cathode heating, but inadequately high voltage across the tank-capacitor to cause any significant amount of the current to flow through the lamp. Instead, to get the lamp ignited, after the initial mode has existed for about one second, a pulse is provided to the base of control transistor CT; which pulse is arranged to last for about 5 milli-seconds, thereby causing transistor FET to become non-conductive for a period of about 5 milliseconds; which means that the inverter will oscillate at its lower frequency for that length of time.

After the cathodes have been pre-heated for about one second (or 1000 milli-seconds), the lamps are ready to ignite; and they then do indeed ignite within the 5 milli-second period during which the inverter oscillates at its lower frequency—this being so for the reason that the high-Q L-C circuit (which consists of tank-inductor L and tank-capacitor C) is resonant at or near this lower frequency; which means, due to so-called Q-multiplication, that the magnitude of the voltage developing across the tank-capacitor will increase until limited by whatever load is present thereacross.

After the lamps ignite (i.e., as soon as lamp current starts flowing), by means of lamp current sensing transformer CT3, control current will be provided to the base of control transistor CT, which will then assure that the inverter will remain in its position of oscillating at the lower frequency as long as lamp current is indeed flowing.

However, if the lamps were to fail to conduct current—perhaps because they were to become inoperative or removed—the inverter will revert to its initial mode of oscillating at its higher frequency; whereafter each 1000 milli-seconds it will for a period of 5 milli-seconds change mode to oscillate at the lower frequency.

If lamp current were to fail to flow, the magnitude of the voltage developing across the tank-capacitor will be limited by the Varistor, the (non-linear) characteristics of which are so chosen as to clamp the voltage magnitude to just the proper level to provide for proper lamp starting. Then, after the lamps have ignited, the magnitude of the voltage across the tank-capacitor will decrease to a lower level due to the loading provided by the lamps; which lower level is substantially lower than the level at which the Varistor provides for voltage clamping. Thus, after the lamps have ignited, current will cease to flow through the Varistor.

Since, in a series-excited parallel-loaded resonant high-Q L-C circuit, the power provided to the load is approximately proportional to the magnitude of the voltage developing across the load, the power provided to the Varistor when it is operative to effect voltage clamping is higher than that provided to the lamps during normal operation; and it is higher by a degree corresponding to the degree by which the lamps' starting voltage is higher than the lamps' operating voltage.

With two series-connected rapid-start lamps, the ratio between starting voltage and operating voltage is about 1.5.

Since the power provided to the lamps during normal operation is about 60 Watt, the power dissipated in the Varistor during any periods when it is constituting the load on the resonant L-C circuit will be about 90 Watt. However, even under the worst of circumstances, the Varistor can only be subject to this 90 Watt load for only about 5 milli-seconds once each 1000 milli-seconds; which means that the average dissipation of the Varistor can not exceed 0.5 Watt. Of course, these worst of circumstances would only occur if the lamp load were to be disconnected (or if it were to fail to ignite) for an extended period of time; in which case the output voltage provided from the ballast would alternate about once each second between a relatively low-magnitude minimum level and a relatively high-magnitude maximum level: the minimum level corresponding to a relatively high frequency, the maximum level corresponding to a relatively low frequency.

Additional Comments a) The setting of adjustable resistor AR will determine the amount of power provided to the lamps during their normal operation; which implies that adjustable resistor AR may be used as a dimming means: the higher the resistance value of AR, the higher the power level provided to the lamps.

b) Transistor FET is a field effect transistor. However, a bi-polar transistor could just as well have been used.

c) It is possible by varying the amount of initial bias on the gate of transistor FET to control the effective initial impedance of this transistor, thereby effectively permitting a gradual or continuous feedback arrangement rather than the abrupt ON/OFF feedback arrangement actually described.

d) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A combination comprising:
   a source providing an AC voltage at an AC output, the source: (i) having control means responsive to a control input, (ii) when receiving the control input, being operative to cause the AC voltage to be of a substantially constant frequency, and (iii) when not receiving the control input, being operative to cause the frequency of the AC voltage to alternate between a higher frequency and a lower frequency;
   gas discharge lamp means connected with the AC output and sometimes operative to be ignited and to draw a lamp current therefrom; and
   sensing means connected in circuit with the gas discharge lamp means and operative: (i) to sense the presence of the lamp current whenever it is flowing, and (ii) in response to the presence of the lamp current, to provide the control input;
   whereby: (i) whenever the gas discharge lamp means fails to draw the lamp current, the frequency of the AC voltage alternates between the higher and the lower frequency, and (ii) whenever the gas discharge lamp means does indeed draw the lamp current, the AC voltage is of the substantially constant frequency.

2. The combination of claim 1 wherein the substantially constant frequency equals the lower frequency.

3. The combination of claim 1 wherein, during a period when the frequency of the AC voltage does alternate between the higher and the lower frequency, most of the time during that period the AC voltage would be of the higher frequency.

4. The combination of claim 1 wherein: (i) the gas discharge lamp means comprises thermionic cathode means operative, after having been provided with cathode heating power for a brief period, to condition the gas discharge lamp to ignite from the AC voltage provided to it, and (ii) the source comprises cathode heating power supply means operative, whenever the control input is not being provided, to provide cathode heating power to the thermionic cathode means at a certain rate.

5. The combination of claim 4 wherein, whenever the control input is being provided, any cathode heating power provided by the cathode heating power supply means is substantially lower than said certain rate.

6. In a ballasting means for a gas discharge lamp, the ballasting means providing a first AC voltage at a first output and a second AC voltage at a second output, both outputs being connectable with the gas discharge lamp, both AC voltages being of the same frequency, the gas discharge lamp having a thermionic cathode connected with the first output and a pair of main lamp terminals connected with the second output, the improvement comprising:
   control means connected within the ballasting means and operative to cause the ballasting means to operate in either of two modes: (i) a first mode wherein the magnitude of the first AC voltage is relatively high, thereby providing a relatively high rate of cathode heating power to the thermionic cathode, the first mode prevailing as long as substantially no power is being drawn from the second output, and (ii) a second mode where the magnitude of the first AC voltage is relatively low, thereby providing a relatively low rate of cathode heating power to the thermionic cathode, the second mode prevailing as long as a substantial amount of power is being drawn from the second output.

7. In a ballasting means for a gas discharge lamp, the ballasting means providing a first AC voltage at a first output and a second AC voltage at a second output, both outputs being connectable with the gas discharge lamp, both AC voltages being of the same frequency, the gas discharge lamp having a thermionic cathode connected with the first output and a pair of main lamp terminals connected with the second output, the improvement comprising:
   control means connected within the ballasting means and operative to cause the ballasting means to operate in either of two modes: (i) a first mode wherein the magnitude as well as the frequency of the first AC voltage is relatively high, thereby providing a relatively high rate of cathode heating power to the thermionic cathode, and (ii) a second mode where the magnitude as well as the frequency of the first AC voltage is relatively low, thereby providing a relatively low rate of cathode heating power to the thermionic cathode, the second mode prevailing as long as a substantial amount of power is being drawn from the second output.

8. The improvement of claim 7 wherein: (i) the first mode represents a lamp conditioning mode, and (ii) the second mode represents a lamp operating mode.

9. A combination comprising:
a source providing an AC power line voltage at a pair of power line terminals; the AC power line voltage having a first frequency;
gas discharge lamp means having a pair of lamp terminals; and
ballast means having a pair of input terminals connected with the power line terminals and a pair of output terminals connected with the lamp terminals; the ballast means being operative to provide an alternating output voltage at the output terminals; the alternating output voltage having a second frequency; the second frequency being substantially constant whenever the gas discharge lamp draws more than a certain amount of power from the output terminals; the second frequency exhibiting periodic variations whenever the gas discharge lamp draws substantially less than said certain amount of power from the output terminals.

10. The combination of claim 9 wherein: (i) the second frequency is substantially higher than the first frequency; and (ii) the periodic variations have a period defined as the period of the periodic variations, which period of the periodic variations is substantially longer than the period of the AC power line voltage.

11. A combination comprising:
a source providing an AC power line voltage at a pair of power line terminals; the AC power line voltage having a first frequency and a first period;
gas discharge lamp having a pair of lamp terminals; and
a ballasting circuit having a pair of input terminals connected with the power line terminals and a pair of output terminals connected with the lamp terminals; the ballastig circuit being operative to provide an alternating output voltage at the output terminals; the alternating output voltage having a second frequency substantially higher than the first frequency as well as a second period substantially shorter than the first period; the second frequency being substantially constant whenever the gas discharge lamp draws more than a certain amount of power from the output terminals; the second frequency exhibiting periodic variations whenever the gas discharge lamp draws substantially less than said certain amount of power from the output terminals; the periodic variations being characterized by having a third frequency and a third period; the third frequency being substantially lower than the first frequency; the third period being substantially longer than the first period.

12. The arrangement of claim 11 wherein the ballasting circuit is also characterized by having frequency-discriminating circuitry connected in circuit with its output terminals.

* * * * *